(12) United States Patent
Schaafsma et al.

(10) Patent No.: US 10,543,746 B2
(45) Date of Patent: Jan. 28, 2020

(54) DUAL NOZZLE-RECEIVING ASSEMBLY

(71) Applicant: Illinois Tool Works Inc., Glenview, IL (US)

(72) Inventors: Christopher Thomas Schaafsma, Wheaton, IL (US); Alexander Max Kerstein, Chicago, IL (US); Shant Bedros Alexanian, Des Plaines, IL (US)

(73) Assignee: Illinois Tool Works Inc., Glenview, IL (US)

( * ) Notice: Subject to any disclaimer, the term of this patent is extended or adjusted under 35 U.S.C. 154(b) by 34 days.

(21) Appl. No.: 15/913,984

(22) Filed: Mar. 7, 2018

(65) Prior Publication Data

US 2018/0281588 A1 Oct. 4, 2018

Related U.S. Application Data

(60) Provisional application No. 62/481,379, filed on Apr. 4, 2017.

(51) Int. Cl.
*B60K 15/05* (2006.01)
*B60K 15/04* (2006.01)

(52) U.S. Cl.
CPC ...... *B60K 15/05* (2013.01); *B60K 2015/0467* (2013.01); *B60K 2015/053* (2013.01); *B60K 2015/0553* (2013.01)

(58) Field of Classification Search
CPC .............................................. B60K 2015/0467
USPC ......................................... 141/350; 220/86.2
See application file for complete search history.

(56) References Cited

U.S. PATENT DOCUMENTS

| 5,431,199 A | * | 7/1995 | Benjay ............. B60K 15/03519 137/588 |
|---|---|---|---|
| 7,549,443 B2 | | 6/2009 | LeVey et al. |
| 7,866,357 B2 | * | 1/2011 | Compere ............... B60K 15/03 123/1 A |
| 7,950,425 B2 | | 5/2011 | Och |
| 8,100,155 B2 | | 1/2012 | Bar et al. |
| 8,714,214 B2 | | 5/2014 | Cisternino |
| 8,807,369 B2 | * | 8/2014 | Sasaki ..................... B60K 15/04 137/527 |
| 8,910,678 B2 | | 12/2014 | Cisternino et al. |

(Continued)

FOREIGN PATENT DOCUMENTS

| DE | 202014005799 | 10/2015 |
|---|---|---|
| FR | 2753138 | 10/1998 |

(Continued)

OTHER PUBLICATIONS

Extended European Search Report for EP 18164220.8-1012/3388272, dated Nov. 22, 2018.

*Primary Examiner* — Timothy L Maust
(74) *Attorney, Agent, or Firm* — Quarles & Brady LLP

(57) ABSTRACT

A nozzle-receiving assembly includes a housing including a fuel inlet that is configured to receive a first nozzle of a fuel dispenser in order to dispense fuel into a fuel fill pipe coupled to the fuel inlet. A door is moveably secured to the housing. The door is configured to be moved between an open position and a closed position. An additive inlet is secured to the door. The additive inlet is configured to receive a second nozzle of an additive dispenser to dispense additive into an additive conduit coupled to the additive inlet.

20 Claims, 13 Drawing Sheets

(56) References Cited

U.S. PATENT DOCUMENTS

| | | | | |
|---|---|---|---|---|
| 9,662,973 B2* | 5/2017 | Betzen | ............... | B60K 15/05 |
| 2007/0125444 A1* | 6/2007 | Hagano | ............... | B60K 15/04 |
| | | | | 141/350 |
| 2016/0016464 A1* | 1/2016 | Betzen | ............... | B60K 15/05 |
| | | | | 296/97.22 |

FOREIGN PATENT DOCUMENTS

| | | |
|---|---|---|
| FR | 3012773 | 5/2015 |
| WO | 2005077698 | 8/2005 |
| WO | 2010021829 | 2/2010 |
| WO | 2011053563 | 5/2011 |

\* cited by examiner

DUAL NOZZLE-RECEIVING ASSEMBLY

RELATED APPLICATIONS

This application relates to and claims priority benefits from U.S. Provisional Patent Application No. 62/481,379, entitled "Fuel Nozzle-Receiving Assembly," filed Apr. 4, 2017, which is hereby incorporated by reference in its entirety.

FIELD OF EMBODIMENTS OF THE DISCLOSURE

Embodiments of the present disclosure generally relate to a fuel nozzle-receiving assembly that is configured to receive two different fluid-dispensing nozzles, such as a fuel nozzle (for example, a diesel fuel nozzle), and an additive nozzle (such as diesel emission fluid nozzle).

BACKGROUND

Various vehicles, such as automobiles, are powered by gasoline, diesel fuel, or the like. As such, the vehicles typically include fuel systems having a tank configured to retain fuel, such as gasoline or diesel fuel, and a fuel fill pipe that serves as an inlet for supplying fuel to the tank from a fuel nozzle of a refueling station. In general, a fuel fill pipe includes an opening that may be exposed during refueling to receive the nozzle. An exposed end portion of the fuel pipe is of sufficient size to receive a discharge tube of a refueling nozzle. The nozzle typically fits relatively loosely in the fuel fill pipe so that the nozzle may be quickly and easily inserted and removed from the fuel fill pipe.

Many passenger and commercial vehicles are powered through diesel fuel. The automotive industry continues to produce diesel powered vehicles at an increasing rate. Refueling stations provide diesel fuel for customers.

Various fuel systems include a mis-fuel inhibitor (MFI). An MFI is a device configured to prevent, for example, a gasoline nozzle from being inserted into a diesel fuel tank, or vice versa. As an example, one type of MFI includes an inlet having an opening that prevents mis-fueling by nozzles having a diameter that exceeds that of the opening. The MFI may include top and bottom doors. While an improper nozzle may be inserted past the top door, the nozzle generally is unable to engage the bottom door as the diameter of the nozzle is too large to pass through a passage proximate to the bottom door. Another type of MFI includes a locking bottom door that only allows a complimentary nozzle to fit therethrough. Additional MFI systems are disclosed in WO 2005/077698, WO 2010/021829, WO 2011/053563, U.S. Pat. Nos. 7,950,425, 7,549,443, and FR 2 753 138, for example. U.S. Pat. Nos. 8,910,678, 8,714,214, 8,100,155, and 7,950,425 also disclose MFI systems.

Manufacturers of compression ignition engines generally need to account for a fluid additive that is required to achieve particular vehicle emissions performance standards. In particular, the fluid additive may be diesel emission fluid (DEF). Typically, two separate fill points are installed within a fuel fill housing. However, this creates an undesirable increase in size of the housing, for all versions of the vehicle, including those with gasoline engines, which do not need the additional fluid fill point.

SUMMARY OF EMBODIMENTS OF THE DISCLOSURE

A need exists for a nozzle-receiving assembly that is configured to receive a first nozzle that dispenses fuel (such as diesel fuel) and a second nozzle that dispenses additive (such as DEF). Further, a need exists for a compact and lightweight nozzle-receiving assembly that accepts the first nozzle and the second nozzle.

With those needs in mind, certain embodiments of the present disclosure provide a nozzle-receiving assembly that includes a housing including a fuel inlet that is configured to receive a first nozzle of a fuel dispenser in order to dispense fuel into a fuel fill pipe coupled to the fuel inlet. A door is moveably secured to the housing. The door is configured to be moved between an open position and a closed position. An additive inlet extends from the door. The additive inlet is configured to receive a second nozzle of an additive dispenser to dispense additive into an additive conduit coupled to the additive inlet. The fuel may be diesel fuel and the additive may be diesel emission fluid (DEF).

In at least one embodiment, a hinge arm moveably couples the door to the housing. At least a portion of the additive conduit may be secured to the hinge arm. The additive conduit may include at least one curved segment secured to the hinge arm.

The fuel inlet and the additive inlet may be covered by the door in the closed position, and exposed when the door is in the open position. The fuel inlet may be spaced apart from the additive inlet a first distance when the door is in the closed position. The fuel inlet may be spaced apart from the additive inlet a second distance when the door is in the open position. The second distance exceeds the first distance.

In at least one embodiment, the additive inlet extends from an interior surface of the door. A trough may extend from the door. The trough defines a fluid retention chamber that connects to the additive inlet. The additive inlet may include a moveable flap that is configured to open and close to selectively open and close the additive inlet. The additive inlet may be outwardly disposed and spaced apart from the fuel inlet when the door is in the closed position.

A magnetic interlock ring may be connected to one or both of the additive inlet or the additive conduit. A flexible tube may extend through a portion of the housing, and connect to the additive conduit.

In at least one embodiment, the additive conduit connects to an additive fill line when the door is in the open position. The additive conduit is disconnected from the additive fill line when the door is in the closed position.

In at least one embodiment, the door moveably connects to the housing through a pivot axle. At least a portion of an additive fill port extends through the pivot axle. The additive conduit connects to the portion of the additive fill port.

A valve member may be disposed within the additive fill port. The valve member closes the additive fill port when the door is in the closed position, and provides at least one outlet in the additive fill port when the door is in the open position.

Figure 1:
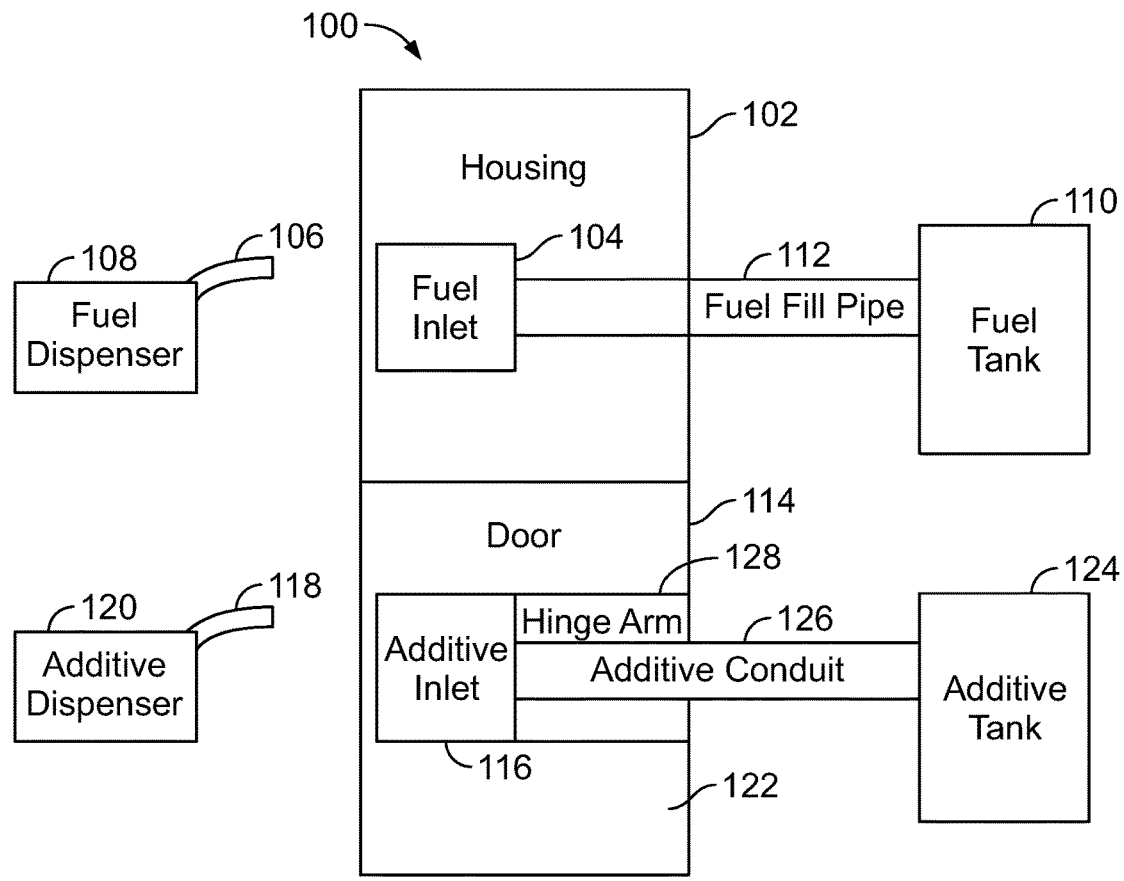
FIG. 1 illustrates a schematic block diagram of a nozzle-receiving assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a nozzle-receiving assembly that provides a single fill point on a vehicle for diesel fuel and diesel emission/exhaust fluid (DEF), also known as AdBlue or urea. The nozzle-receiving assembly accommodates a diesel inlet (such as a capless or capped inlet) as well as a DEF accepting fill point or inlet. The DEF fill point can be a capped or capless inlet, and/or a trough (such as configured to receive DEF from a bottle).

In at least one embodiment, the nozzle-receiving assembly includes a DEF inlet inside a door with an integrated hinge arm. By locating the DEF fill inlet interface and routing inside the door, the DEF fill point may be disposed outboard from a diesel fill position while the door of the nozzle-receiving assembly is in a closed position, thereby reducing the overall door and assembly size. The fill point for the DEF inlet may be in the hinge arm and/or the door.

Further, the nozzle-receiving assembly provides a greater distance between the DEF fill point and the diesel fuel fill point (in comparison to conventional fill housings), thereby segregating the two fluid systems to avoid cross-contamination.

Embodiments of the present disclosure provide a common-sized housing that may be used with gasoline and diesel vehicles. The housing may include a single fill pipe opening for gasoline. When used with diesel vehicles, the housing includes a fill pipe opening for diesel and a DEF fill point integrated into the housing closure door.

Embodiments of the present disclosure provide the following advantages: reduced tooling cost and complexity for fuel fill housings and doors; reduced fill door size for styling preferences; reduced housing and hinge length and height for vehicle packaging purposes; and reduced potential for cross contamination between diesel fuel and DEF systems. The nozzle-receiving assembly is configured to allow for fluid flow from the pivoting door location to a fixed DEF fill pipe.

Embodiments of the present disclosure a housing including a fuel inlet that is configured to receive a first nozzle of a fuel dispenser in order to dispense fuel into a fuel fill pipe coupled to the fuel inlet. A door is moveably secured to the housing. The door is configured to be moved between an open position and a closed position. An additive inlet is secured to the door. The additive inlet is configured to receive a second nozzle of an additive dispenser to dispense additive into an additive conduit coupled to the additive inlet.

FIG. 1 illustrates a schematic block diagram of a nozzle-receiving assembly 100, according to an embodiment of the present disclosure. The nozzle-receiving assembly 100 includes a housing 102 having a fuel inlet 104, which includes an opening that is configured to receive a first nozzle 106 of a fuel dispenser 108, such as a diesel fuel dispenser. The fuel inlet 104 is in fluid communication with a fuel tank 110 through a fuel fill pipe 112.

A door 114 is moveably coupled to the housing 102. The door 114 is configured to move between a closed position, in which the fuel inlet 104 is covered, and an open position, in which the fuel inlet 104 is exposed. The door 114 may be pivotally coupled to the housing 102, such as through a hinge, a pivot axle, or the like.

The door 114 includes an additive inlet 116, which includes an opening that is configured to receive a second nozzle 118 of an additive dispenser 120. The additive inlet 116 may extend from on an interior surface 122 of the door 114. As such, when the door 114 is in the closed position, the additive inlet 116 is covered by the door 114 and not exposed to an exterior environment.

The additive inlet 116 may be mounted on the interior surface 122. In at least one other embodiment, the additive inlet 116 may be integrally molded and formed with the door 114.

The additive inlet 116 is in fluid communication with an additive tank 124 through an additive conduit 126. At least a portion of the additive conduit 126 extends through a hinge arm 128 that couples the door 114 to the housing 102. For example, the hinge arm 128 may extend from the interior surface 122 of the door 114 to a portion of the housing 102. Alternatively, the additive inlet 116 may be in fluid communication with the fuel tank 110 through the additive conduit 126, instead of a separate and distinct additive tank 124. The additive conduit 126 may include or otherwise connect to an additive fill port and/or line that connects to the additive tank 124. That is, the additive fill port and/or line may be considered part of the additive conduit 126.

In at least one embodiment, the fuel dispenser 108 is a diesel fuel dispenser that is configured to dispense diesel fuel. The additive dispenser 120 is a DEF dispenser that is configured to dispense DEF. Optionally, the additive may be other than DEF. For example, in at least one embodiment, the additive may be a liquid other than fuel, such as water.

The housing 102 may be secured to a frame of a vehicle, for example. The housing 102 may directly or indirectly connect to an improper fuel nozzle insertion-inhibiting assembly, such as a mis-fuel inhibitor (MFI) assembly. The MFI assembly is configured to prevent improper fuel-dispensing devices from dispensing fuel into the fuel fill pipe 112 connected to the MFI assembly. For example, the MFI assembly prevents a gasoline dispensing device from being inserted into a diesel fuel intake system, or vice versa. That is, a gasoline fuel-dispensing device is an improper or incompatible fuel-dispensing device in relation to a diesel fuel intake system, while a diesel fuel-dispensing device is an improper or incompatible fuel-dispensing device in relation to a gasoline fuel intake system.

The fuel dispenser 108 may include a handle operatively connected to a trigger. The handle is configured to be grasped by an operator and connects to the nozzle 106. Similarly, the additive dispenser 120 may include a handle operatively connected to a trigger. The handle is configured to be grasped by an operator and connects to the nozzle 118. Optionally, the additive dispenser 120 may be a bottle having a nozzle 118, such as a dispensing neck.

In operation, in order to dispense fuel into the fuel tank 110 and additive into the additive tank 124, the door 114 is moved into the open position with respect to the housing, thereby exposing the fuel inlet 104 and the additive inlet 116 on the interior surface 122 of the door 114. The first nozzle 106 of the fuel dispenser 108 may then be inserted into the fuel inlet 104 to dispense fuel from the fuel dispenser 108 into the fuel tank 110 via the fuel fill pipe 112. Similarly, the second nozzle 118 of the additive dispenser 120 may be inserted into the exposed additive inlet 116 to dispense additive from the additive dispenser 120 into the additive tank 124 via the additive conduit 126.

Figure 2:
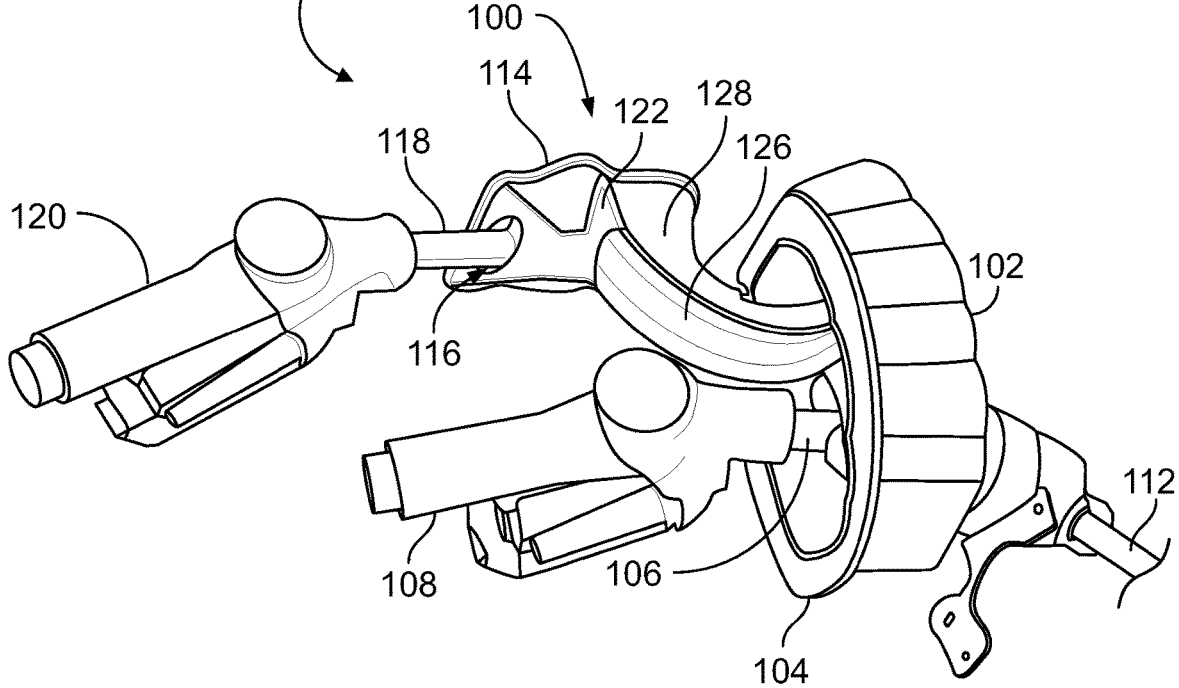
FIG. 2 illustrates a perspective top view of a nozzle-receiving assembly having a door in an open position, according to an embodiment of the present disclosure.

FIG. 2 illustrates a perspective top view of the nozzle-receiving assembly 100 having the door 114 in an open position, according to an embodiment of the present disclosure. When the door 114 is in the open position, the fuel inlet 104 and the additive inlet 116 on the interior surface 122 of the door are exposed. As such, the nozzle 108 of the fuel dispenser 108 may be inserted into the fuel inlet 104, while the nozzle 118 of the additive dispenser 120 may be inserted into or proximate to the additive inlet 116. The additive conduit 126 extends through the hinge arm 128, which pivotally couples the door 114 to the housing 102.

After the fuel dispenser 108 and the additive dispenser 120 are removed from the nozzle-receiving assembly 100, the door 114 may be pivoted closed in the direction of arc A. When the door 114 is in the closed position, the fuel inlet 104 and the additive inlet 116 are covered by the door 116. Further, when the door 114 is in the closed position, the additive inlet 116 is outwardly disposed and spaced apart from the fuel inlet 104. In at least one embodiment, the additive inlet 116 may be differently oriented than the fuel inlet 104 when the door 114 is in the closed position, whether or not the distances between the fuel inlet 104 and the door 114 change when the door 114 is in the closed and open positions.

When the door 114 is in the open position, the additive inlet 116 is distally located from the fuel inlet 104, thereby ensuring that the fuel dispenser 108 and the additive dispenser 120 are separated. In at least one embodiment, the additive inlet 116 is configured to receive only the nozzle 118 of the additive dispenser 120, while the fuel inlet 104 is configured to receive only the nozzle 106 of the fuel dispenser 108. The inlets 104 and 116 may be sized and shaped to receive only specific sized and shaped nozzles.

Figure 3:
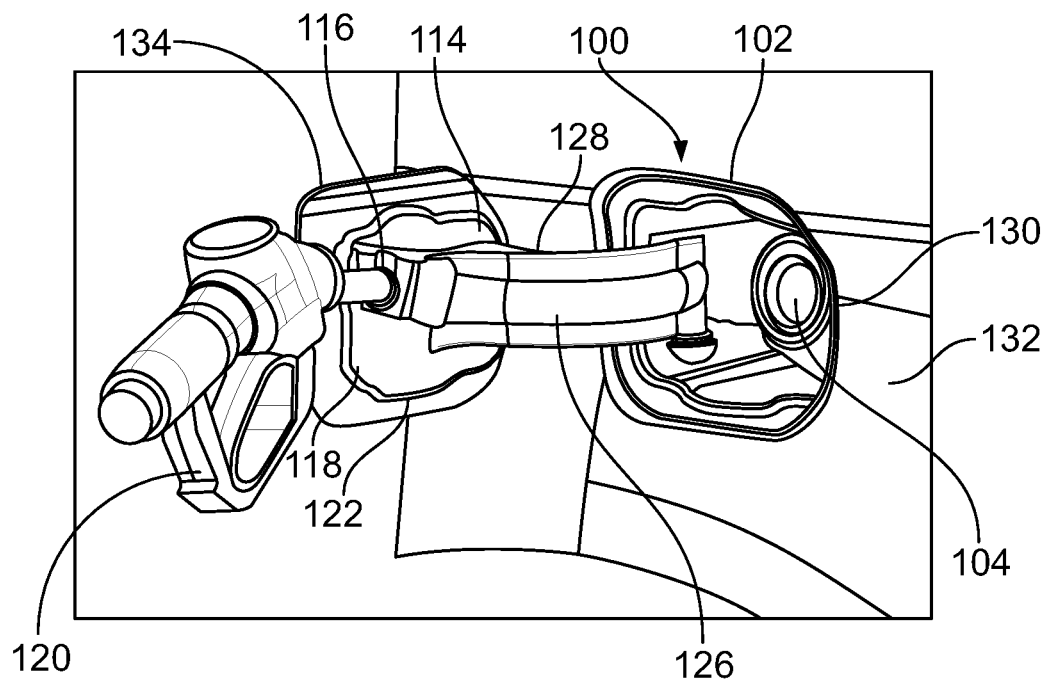
FIG. 3 illustrates a perspective front view of a nozzle-receiving assembly having a door in an open position and receiving a nozzle of an additive dispenser, according to an embodiment of the present disclosure.
Figure 4:
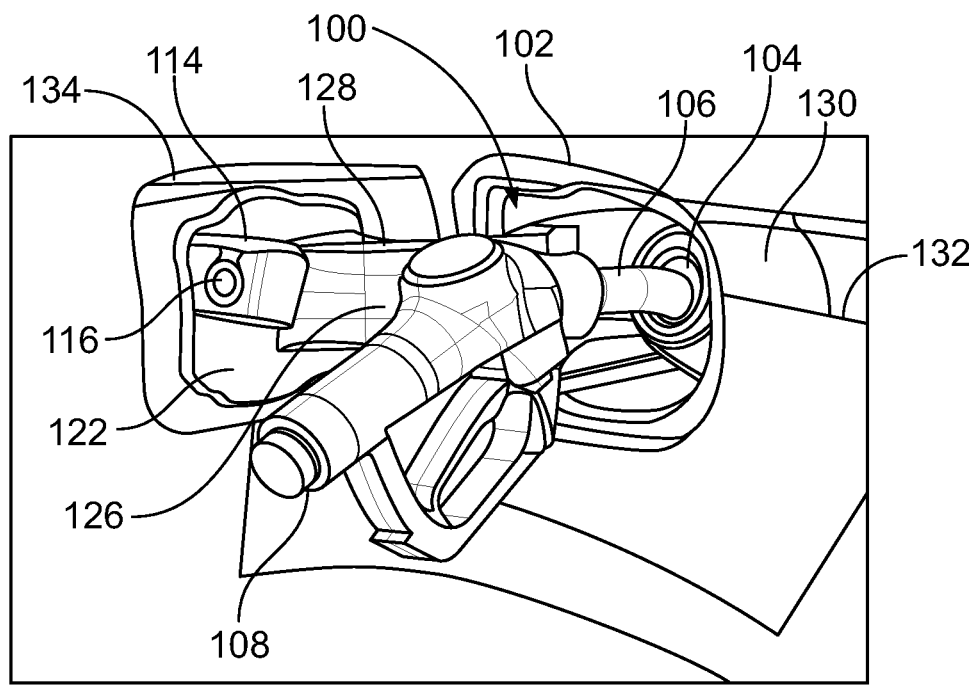
FIG. 4 illustrates a perspective front view of a nozzle-receiving assembly having a door in an open position and receiving a nozzle of a fuel dispenser, according to an embodiment of the present disclosure.

FIG. 3 illustrates a perspective front view of the nozzle-receiving assembly 100 having the door 114 in the open position and receiving the nozzle 118 of the additive dispenser 120. FIG. 4 illustrates a perspective front view of the nozzle-receiving assembly 100 having the door 114 in the open position and receiving the nozzle 106 of the fuel dispenser 108. Referring to FIGS. 3 and 4, the nozzle-receiving assembly 100 may be secured to a frame 130 of a vehicle 132, such as an automobile, truck, or the like. Further, an outer panel 134 may be secured to an exterior surface of the door 114 opposite from the interior surface 122.

Referring to FIGS. 1-4, by locating the additive inlet 116 on the door 114, as opposed to the housing 102, the additive inlet 116 is distally located from the fuel inlet 104. As such, any chance of the fuel and the additive inadvertently mixing is greatly reduced.

Figure 5:
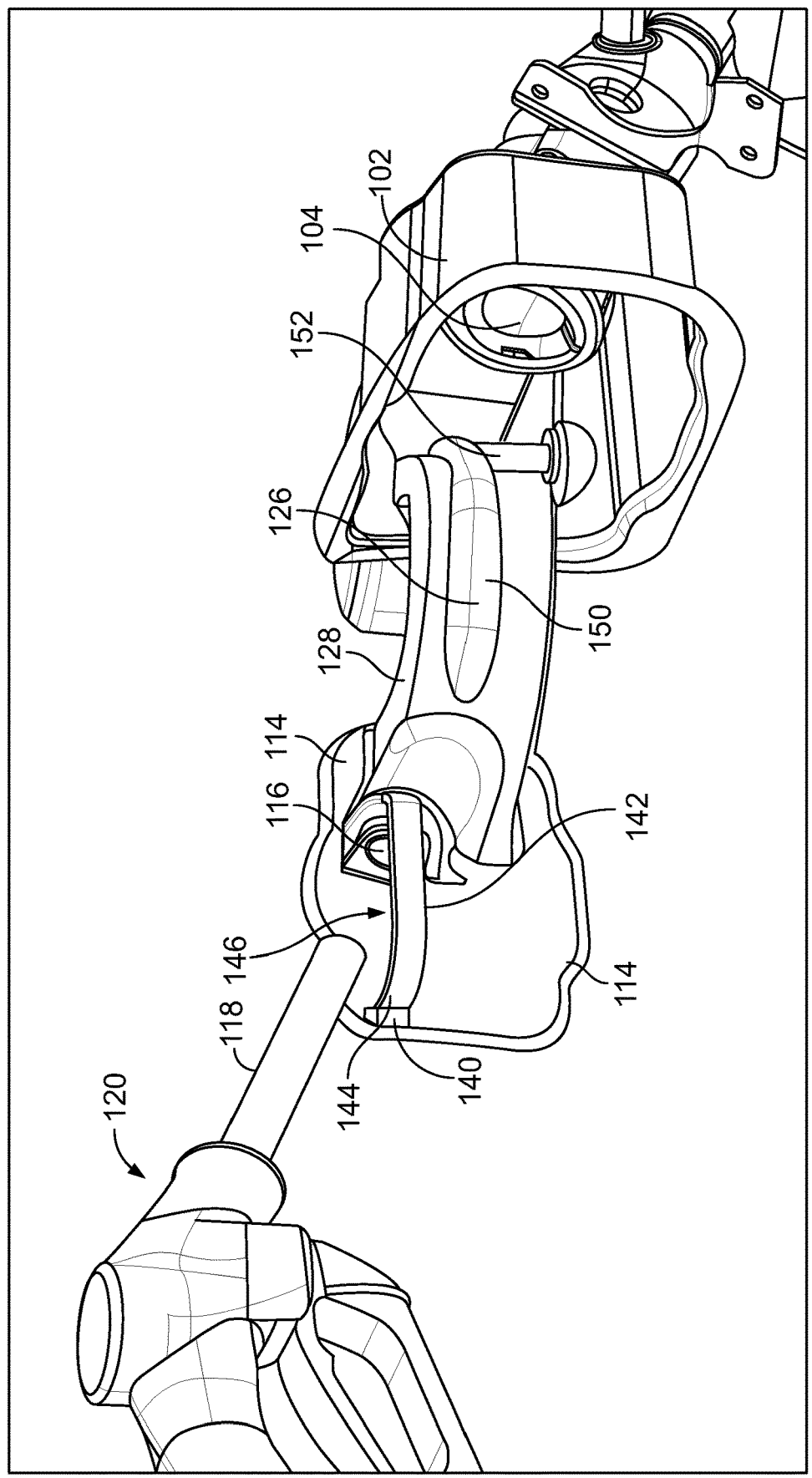
FIG. 5 illustrates a perspective front view of a nozzle-receiving assembly having a door in an open position, according to an embodiment of the present disclosure.

FIG. 5 illustrates a perspective front view of the nozzle-receiving assembly 100 having the door 114 in the open position, according to an embodiment of the present disclosure. As shown, a trough 140 may extend inwardly from the interior surface 122 of the door 114. The trough 140 includes a base 142 and upstanding wall 144 connected to the base 142. A fluid retention chamber 146 is defined between the base 142, the wall 144, and the interior surface 122 of the door 114. The fluid retention chamber 146 fluidly connects to the additive inlet 116. As such, additive within the fluid retention chamber 146 flows into the additive inlet 116, thereby reducing the likelihood of spillage. Further, additive may be poured into the fluid retention chamber 146, such as through a bottle, and flow into the additive inlet 116.

The additive conduit 126 extends through the hinge arm 128. For example, the additive conduit 126 includes a curved segment 150 extending through or within the hinge arm 128. The curved segment 150 connects at one end to the additive inlet 116. An opposite end of the curved segment 150 connects to a downward segment 152 within the housing 102 that connects to the additive tank 124 (shown in FIG. 1) and/or an additive fill line that connects to the additive tank 124.

Figure 6:
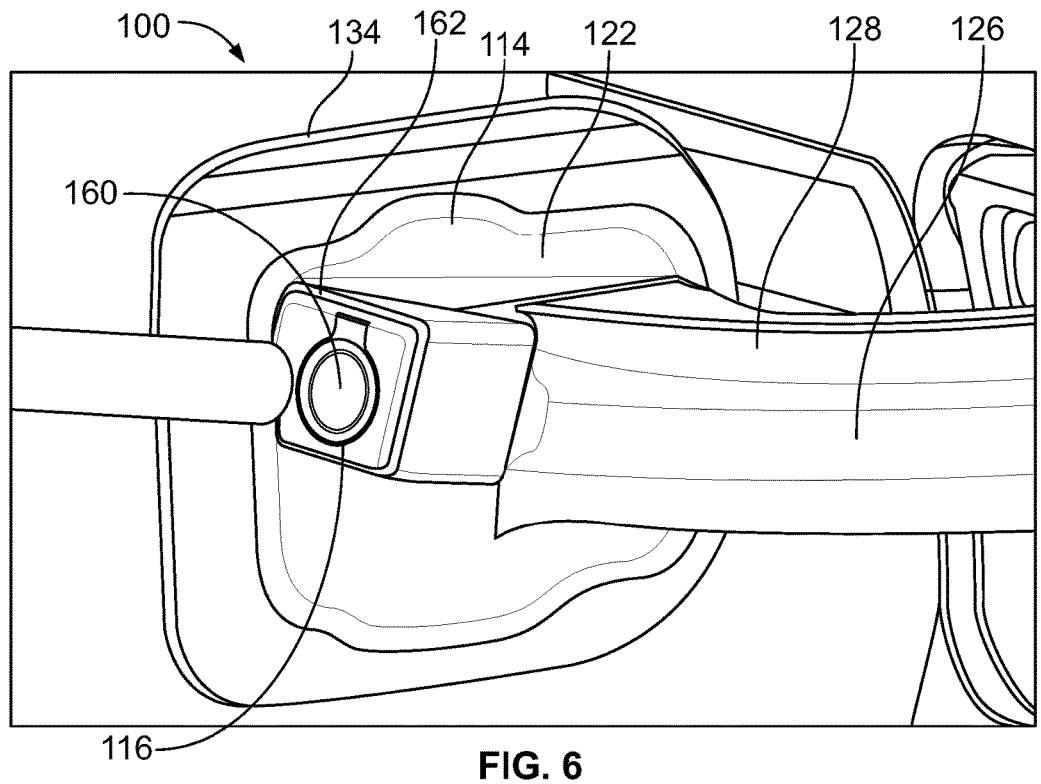
FIG. 6 illustrates a perspective front view of an additive inlet connected to an interior surface of a door of a nozzle-receiving assembly, according to an embodiment of the present disclosure.

FIG. 6 illustrates a perspective front view of the additive inlet 116 connected or otherwise secured to the interior surface 122 of the door 114 of the nozzle-receiving assembly 100, according to an embodiment of the present disclosure. A moveable flap 160 may selectively close and open the additive inlet 116. The flap 160 may be pivotally coupled to a wall 162 extending inwardly from the interior surface 122 of the door 114. As the nozzle 118 is inserted into the flap 160, the flap 160 pivots open.

Figure 7:
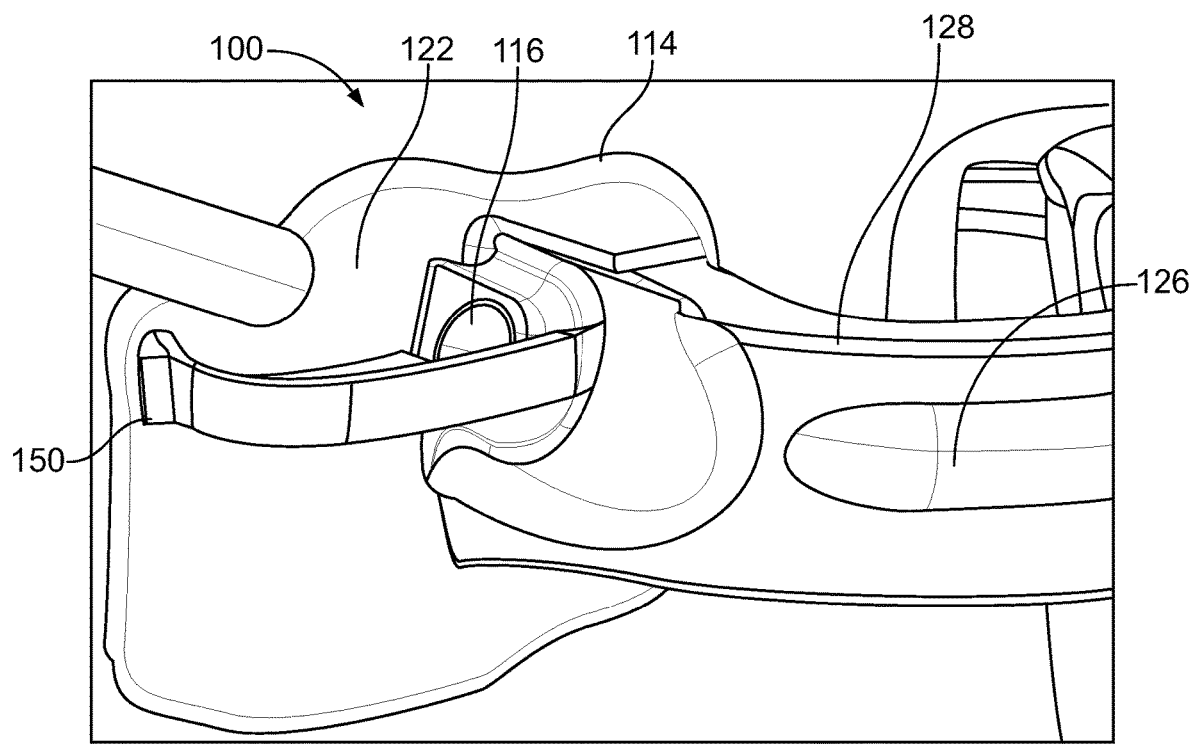
FIG. 7 illustrates a perspective front view of an additive inlet connected to an interior surface of a door of a nozzle-receiving assembly, according to an embodiment of the present disclosure.

FIG. 7 illustrates a perspective front view of the additive inlet 116 connected or otherwise secured to the interior surface 122 of the door 114 of the nozzle-receiving assembly 100, according to an embodiment of the present disclosure. In this embodiment, the trough 140 inwardly extends from the interior surface 122 of the door 114. The additive inlet 116 may or may not include a flap, such as the flap 160.

Figure 8:
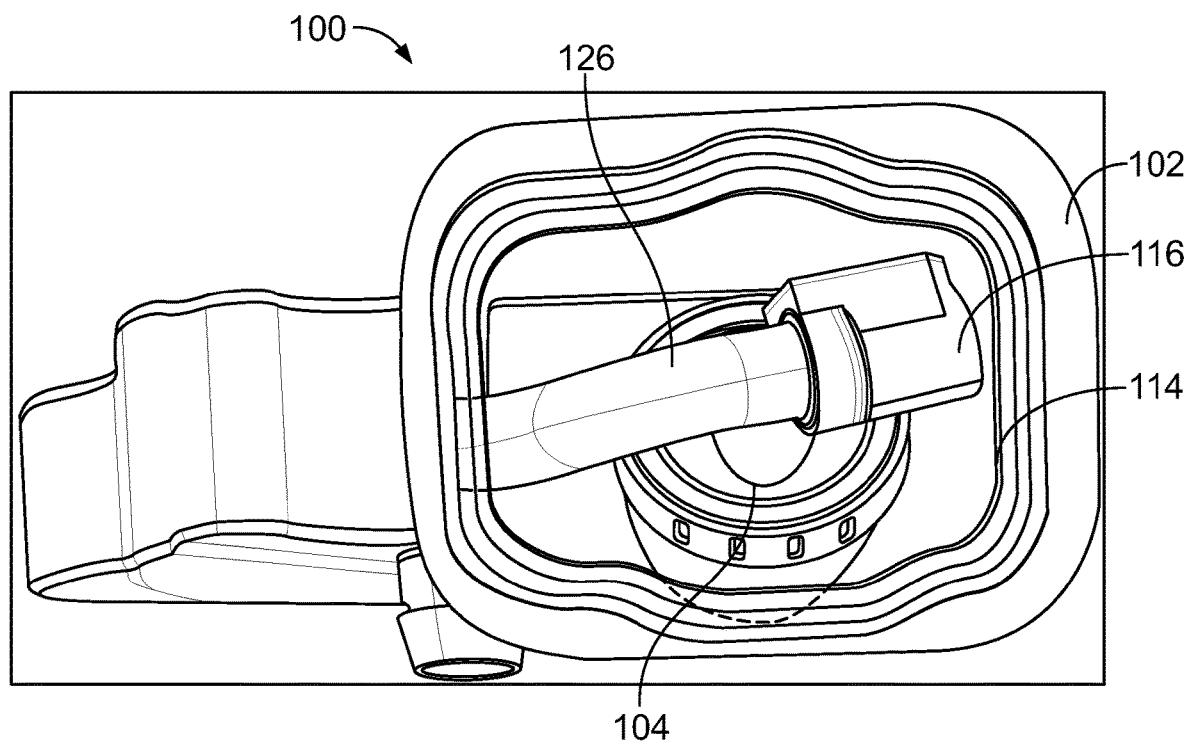
FIG. 8 illustrates a perspective front view of a nozzle-receiving assembly having a door in a closed position, according to an embodiment of the present disclosure.
Figure 9:
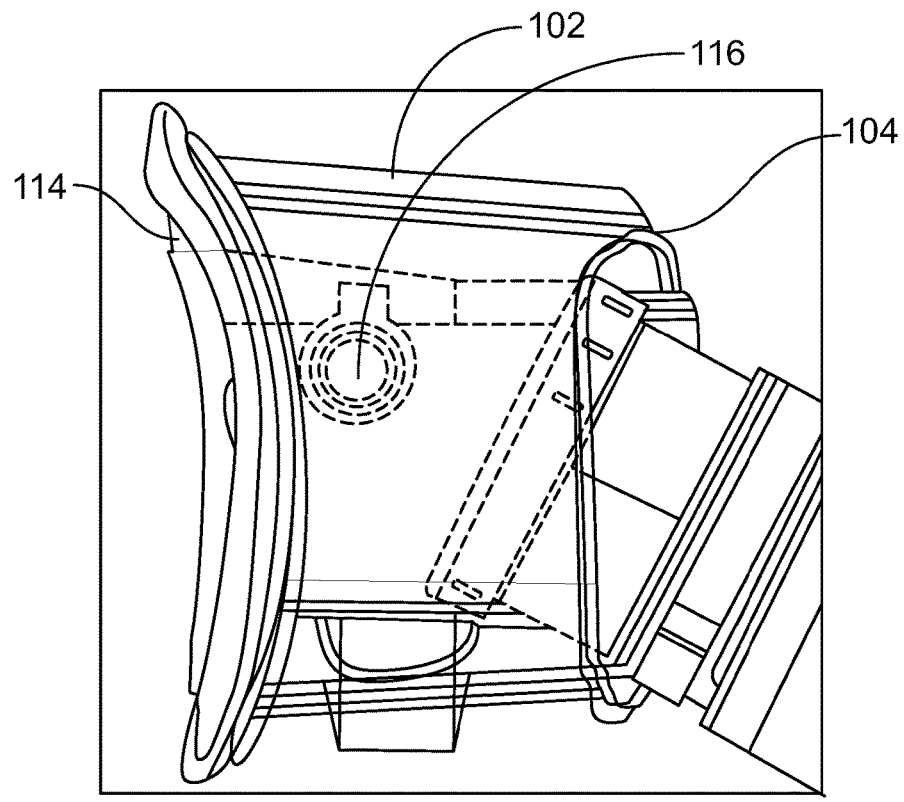
FIG. 9 illustrates a lateral view of a nozzle-receiving assembly having a door in a closed position, according to an embodiment of the present disclosure.

FIG. 8 illustrates a perspective front view of the nozzle-receiving assembly 100 having the door 114 in a closed position, according to an embodiment of the present disclosure. FIG. 9 illustrates a lateral view of the nozzle-receiving assembly 100 having the door 114 in the closed position. Referring to FIGS. 8 and 9, portions of the nozzle-receiving assembly 100 (such as the door 114 and lateral wall portions of the housing 102) are shown transparent so that internal components are shown. When the door 114 is closed, the additive inlet 116 is outwardly disposed (that is, outboard) from and spaced apart from the fuel inlet 104.

Figure 10:
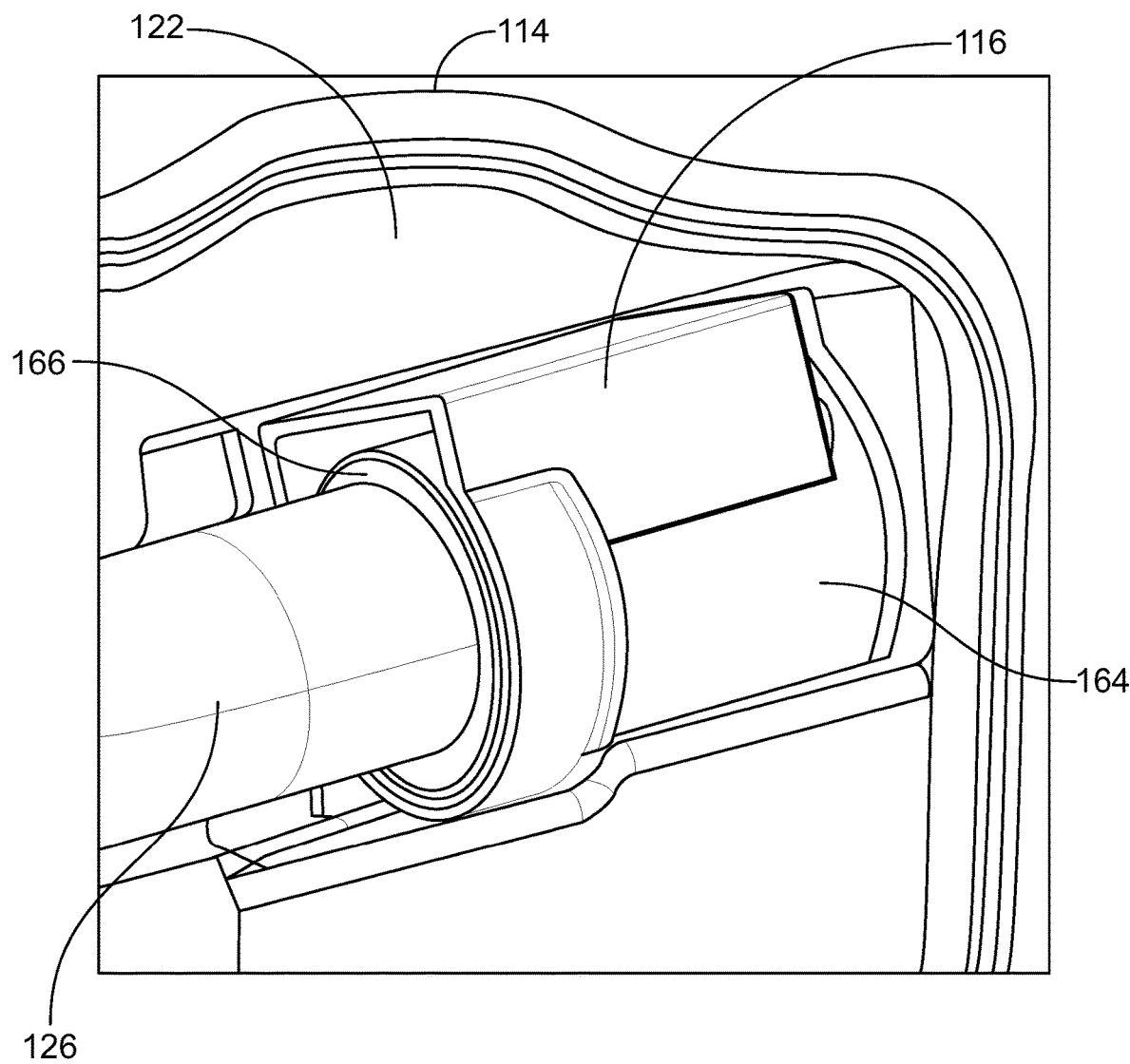
FIG. 10 illustrates a perspective front view of an additive inlet inwardly extending from an interior surface of a door, according to an embodiment of the present disclosure.

FIG. 10 illustrates a perspective front view of the additive inlet 116 inwardly extending from the interior surface 122 of the door 114, according to an embodiment of the present disclosure. The additive inlet 116 may include a tube 164 defining a central passage. The tube 164 inwardly extends from the interior surface 122 of the door 114. The tube 164 connects to the additive conduit 126. A magnetic interlock ring 166 may be secured within the tube 164 around the central passage and/or a portion of the additive conduit 126. The magnetic interlock ring 166 may magnetically couple the additive inlet 116 to the additive conduit 126 and/or the nozzle 106 (shown in FIGS. 1 and 2, for example) when the nozzle 106 is inserted into the additive inlet 116. Optionally, the additive conduit 126 may not include the magnetic interlock ring 166.

Figure 11:
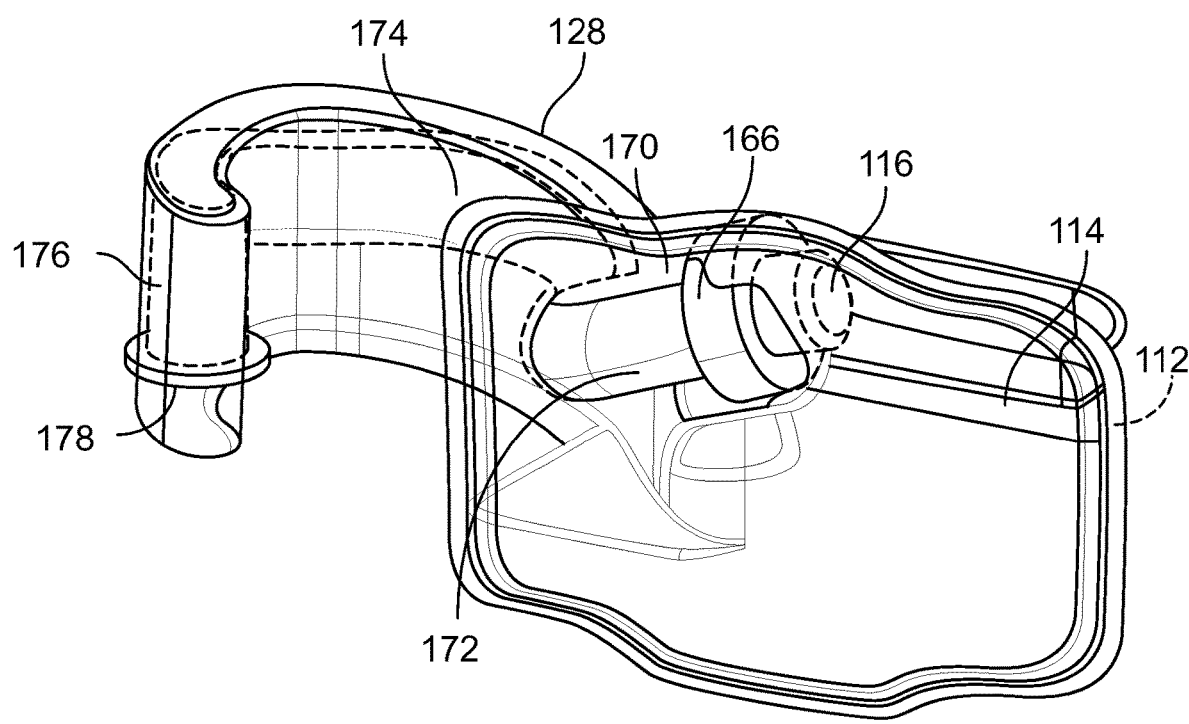
FIG. 11 illustrates a perspective front view of an additive conduit extending through a hinge arm of a door, according to an embodiment of the present disclosure.

FIG. 11 illustrates a perspective front view of the additive conduit 126 extending through the hinge arm 128 of the door 114, according to an embodiment of the present disclosure. The hinge arm 128 may be an integral part of the door 114. Optionally, the hinge arm 128 may be a separate piece that is secured to the door 114. For the sake of clarity, portions of the door 114 are shown transparent in order to show the additive conduit 126.

The additive inlet 116 connects to an inlet end 170 of the additive conduit 126. The inlet end 170 includes a downwardly sloped segment 172 that may abut against the interior surface 122 of the door 114. The downwardly sloped segment 172 connects to a curved segment 174 that conforms to the shape of the hinge arm 128, and may extend through the hinge arm 128. The curved segment 174 connects to a downwardly directed segment 176 having an outlet end 178.

Figure 12:
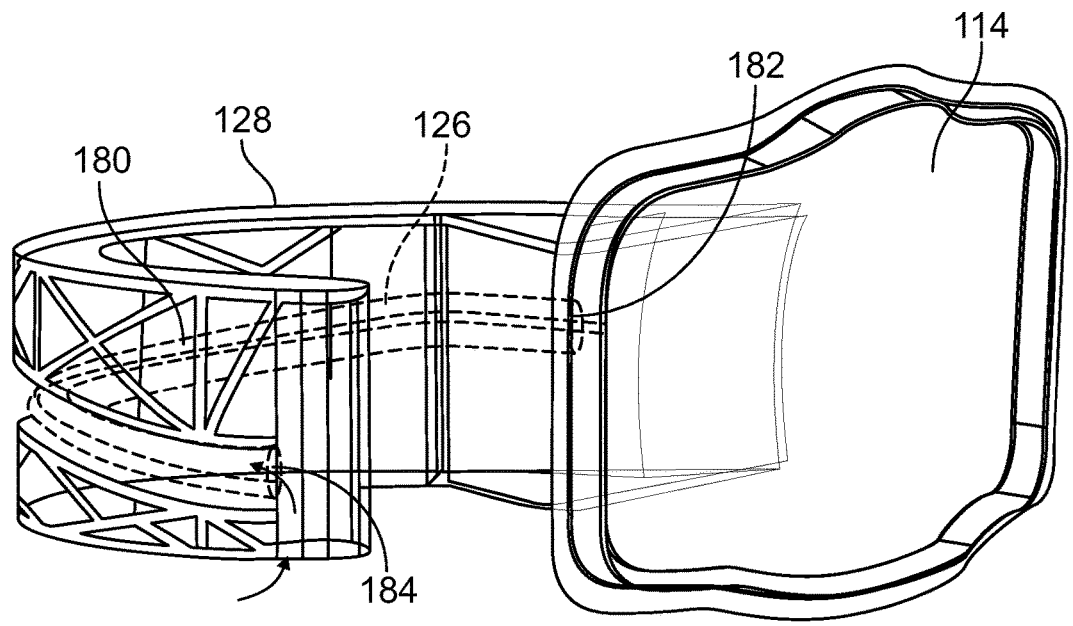
FIG. 12 illustrates a perspective front view of an additive conduit extending through a hinge arm of a door, according to an embodiment of the present disclosure.

FIG. 12 illustrates a perspective front view of the additive conduit 126 extending through the hinge arm 128 of the door 114, according to an embodiment of the present disclosure. For the sake of clarity, portions of the door 114 are shown transparent in order to show the additive conduit 126. In this embodiment, the additive conduit 126 may be a curved tube 180 having an inlet end 182 and an outlet end 184 at substantially the same orientation and residing in substantially the same plane.

Figure 13:
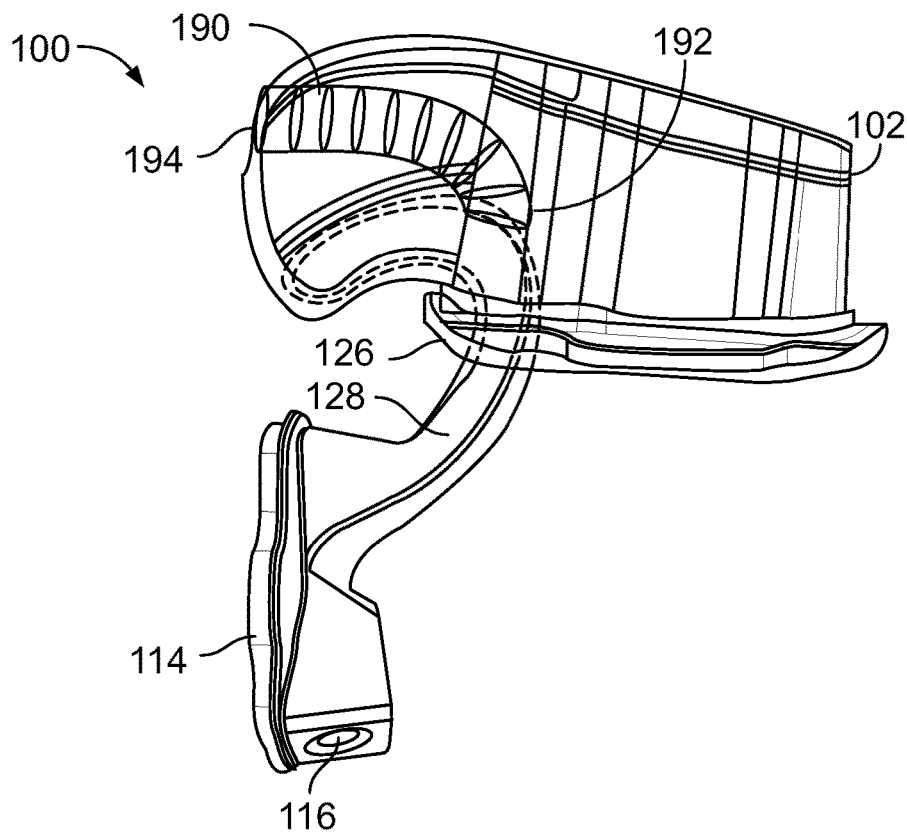
FIG. 13 illustrates a top view of a nozzle-receiving assembly having a door in an open position, according to an embodiment of the present disclosure.
Figure 14:
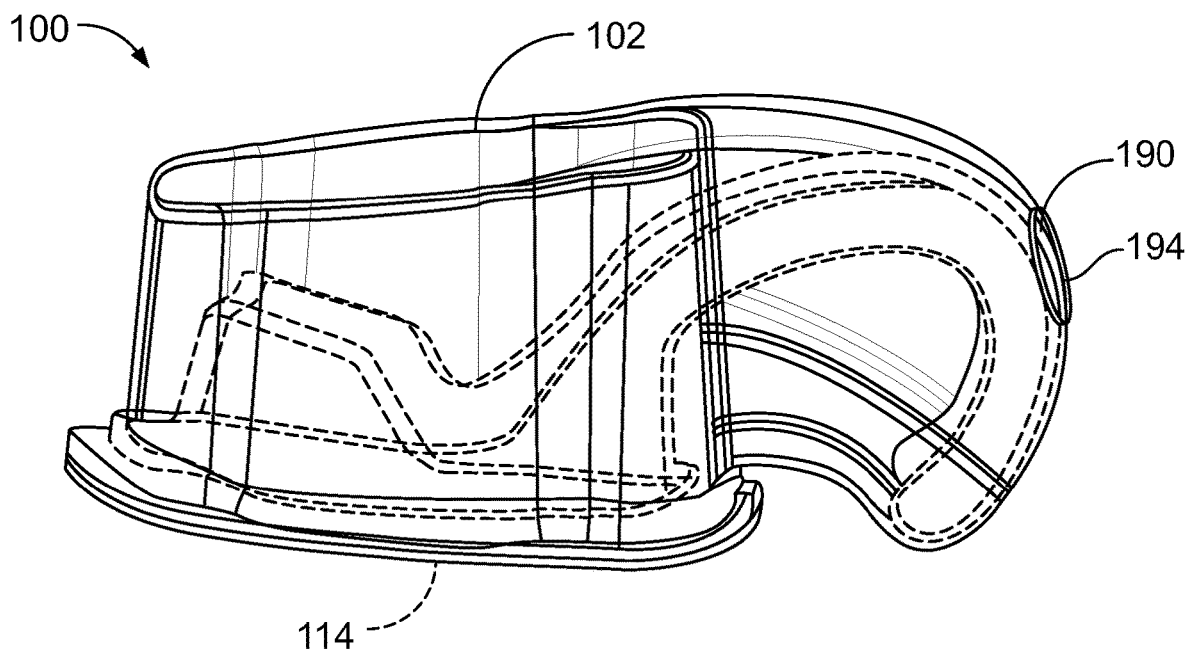
FIG. 14 illustrates a bottom view of a nozzle-receiving assembly having a door in a closed position, according to an embodiment of the present disclosure.

FIG. 13 illustrates a top view of the nozzle-receiving assembly 100 having the door 114 in an open position, according to an embodiment of the present disclosure. FIG. 14 illustrates a bottom view of the nozzle-receiving assembly 100 having the door 114 in a closed position. Referring to FIGS. 13 and 14, a flexible tube 190 extends through a portion of the housing 102. The tube 190 includes an inlet 192 and an outlet 194. The inlet 192 may be secured to the inlet conduit 126 when the door 114 is in the open position and the closed position. In at least one other embodiment, when the door 114 is open, the inlet 192 connects to an outlet end of a segment of the additive conduit 126. When the door 114 is closed, the inlet 192 is separated from the outlet end of the segment of the additive conduit 126. The tube 190 may form a part of the additive conduit 126. In at least one embodiment, the additive conduit 126 may be contiguous when the door 114 is open, and disconnected when the door 114 is closed. That is, the additive conduit 126 may include separable portions.

Figure 15:
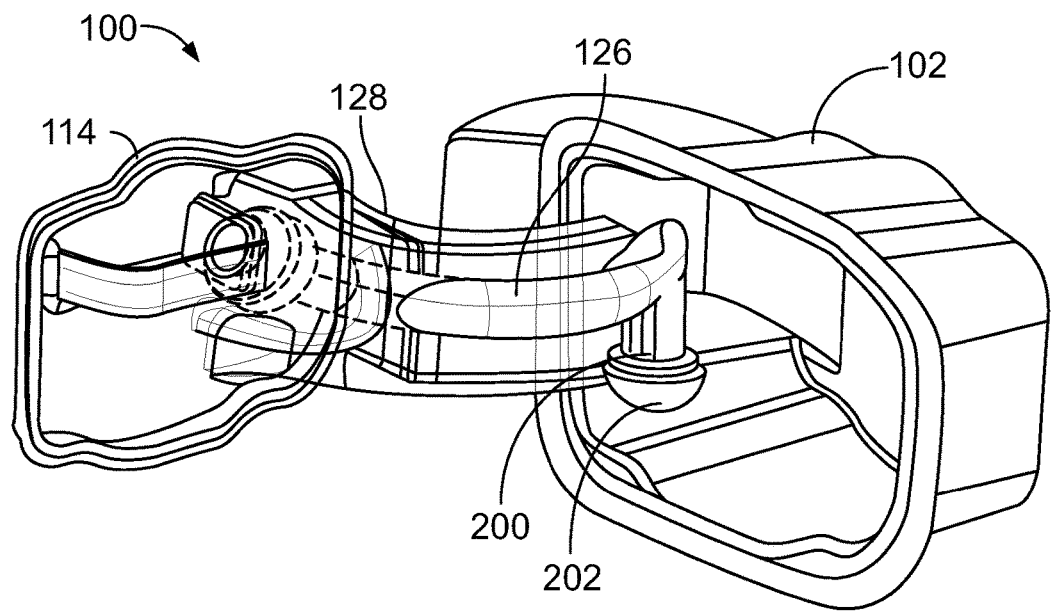
FIG. 15 illustrates a perspective front view of a nozzle-receiving assembly having a door in an open position, according to an embodiment of the present disclosure.
Figure 16:
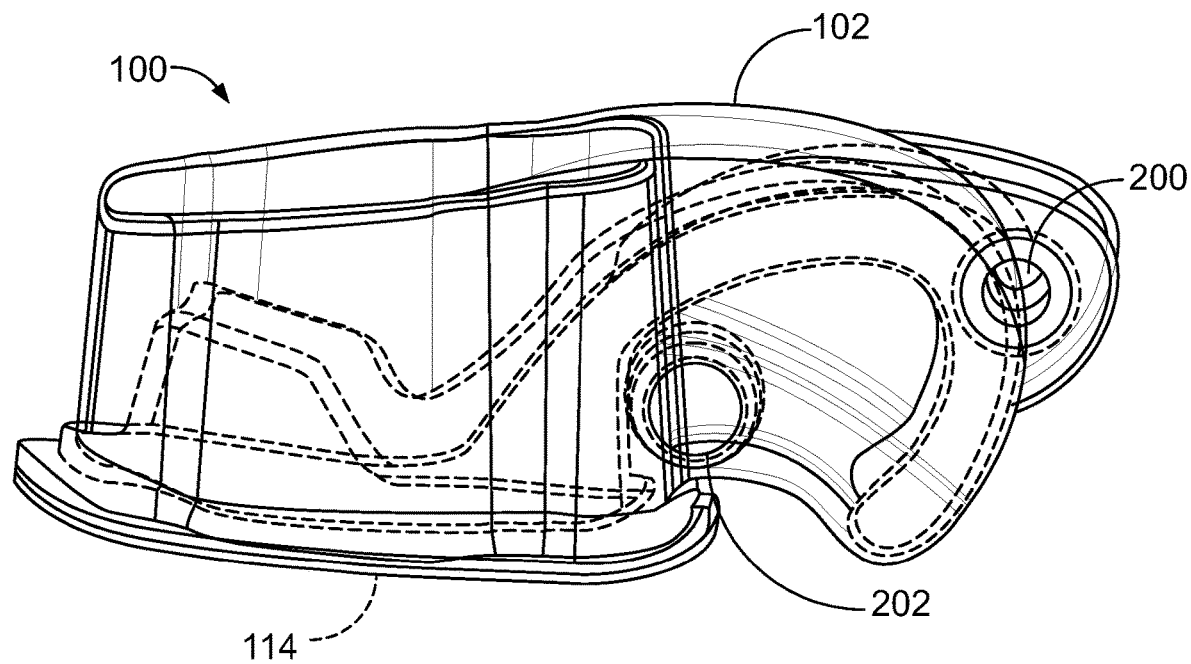
FIG. 16 illustrates a bottom view of a nozzle-receiving assembly having a door in a closed position, according to an embodiment of the present disclosure.

FIG. 15 illustrates a perspective front view of the nozzle-receiving assembly 100 having the door 114 in an open position, according to an embodiment of the present disclosure. FIG. 16 illustrates a bottom view of the nozzle-receiving assembly 100 having the door 114 in a closed position. Referring to FIGS. 15 and 16, when the door 114 is opened, an outlet end 200 of the additive conduit 126 connects to an inlet end 202 of an additive fill line, which may or may not be part of the additive conduit 126. As shown in FIGS. 15 and 16, a spouted routing connection may couple the additive to an additive fill port and/or line.

Figure 17:
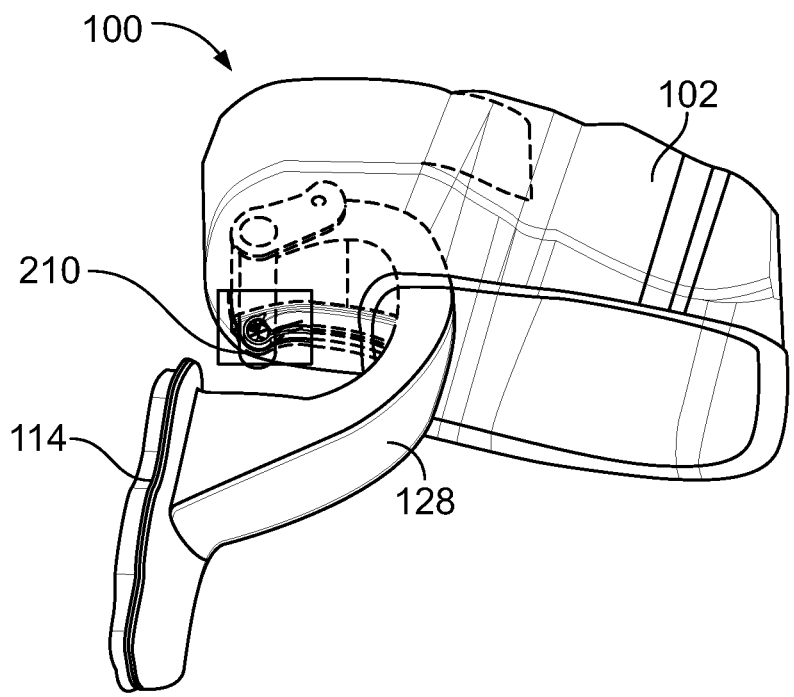
FIG. 17 illustrates a perspective top view of a nozzle-receiving assembly having a door in an open position, according to an embodiment of the present disclosure.
Figure 18:
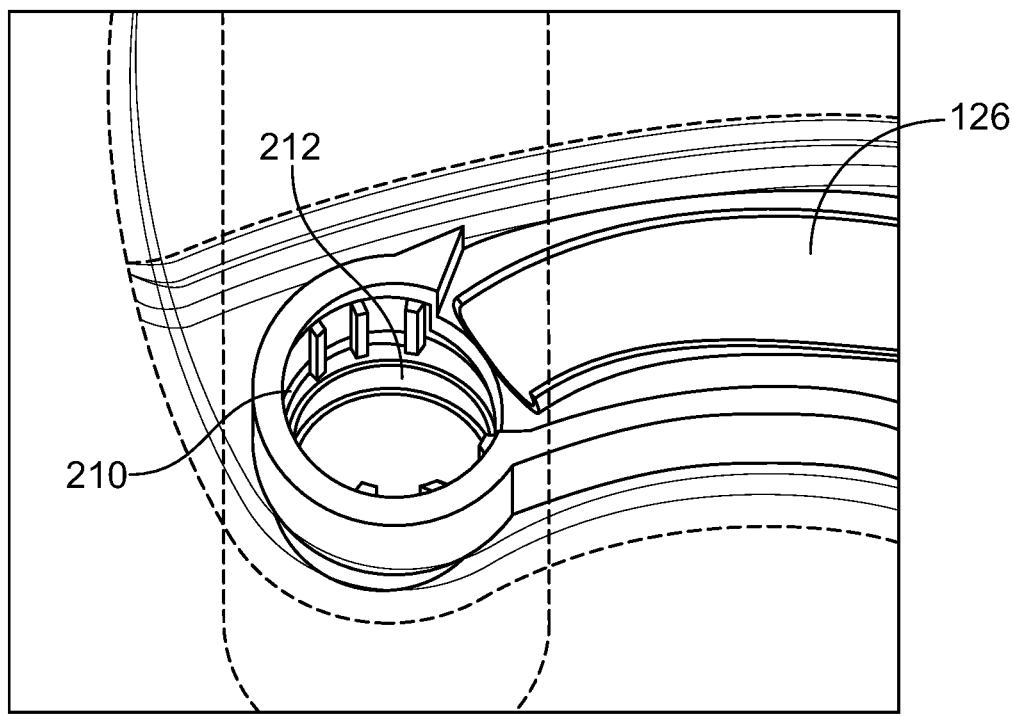
FIG. 18 illustrates an additive fill inlet formed through a pivot axle, according to an embodiment of the present disclosure.

FIG. 17 illustrates a perspective top view of the nozzle-receiving assembly 100 having the door 114 in an open position, according to an embodiment of the present disclosure. FIG. 18 illustrates an additive fill port 212 formed through a pivot axle 210, according to an embodiment of the present disclosure. Referring to FIGS. 17 and 18, the pivot axle 210 may be secured to the housing 102. The hinge arm 128 pivotally secures to the pivot axle 210. That is, the hinge arm 128 pivots about the pivot axle 210 between the open and closed positions. The additive fill port 212 may be formed through a central portion of the pivot axle 210. The additive conduit 126 is in fluid communication with the additive fill port 212 when the door 114 is opened and closed.

Figure 19:
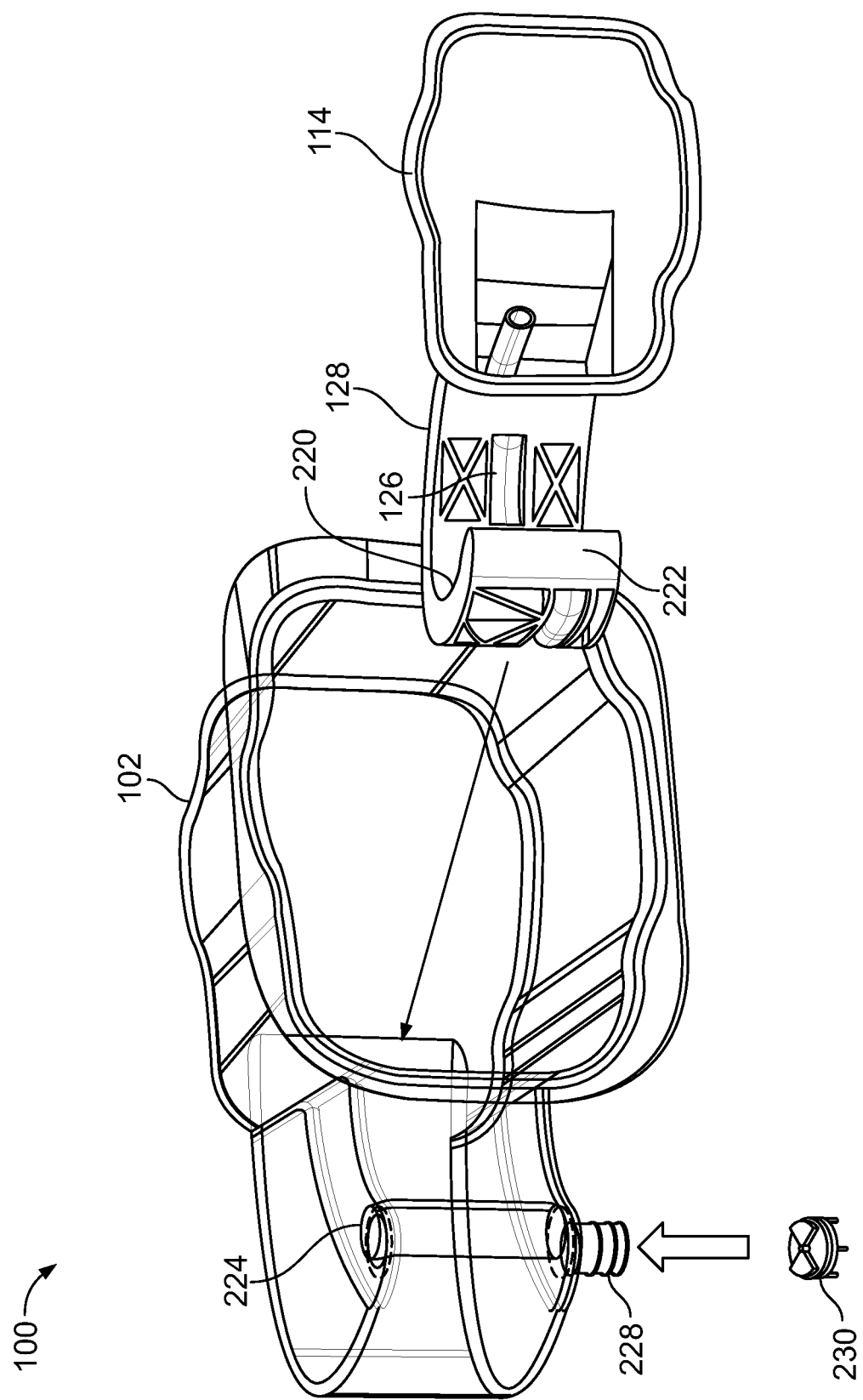
FIG. 19 illustrates a perspective front exploded view of a nozzle-receiving assembly, according to an embodiment of the present disclosure.
Figure 20:
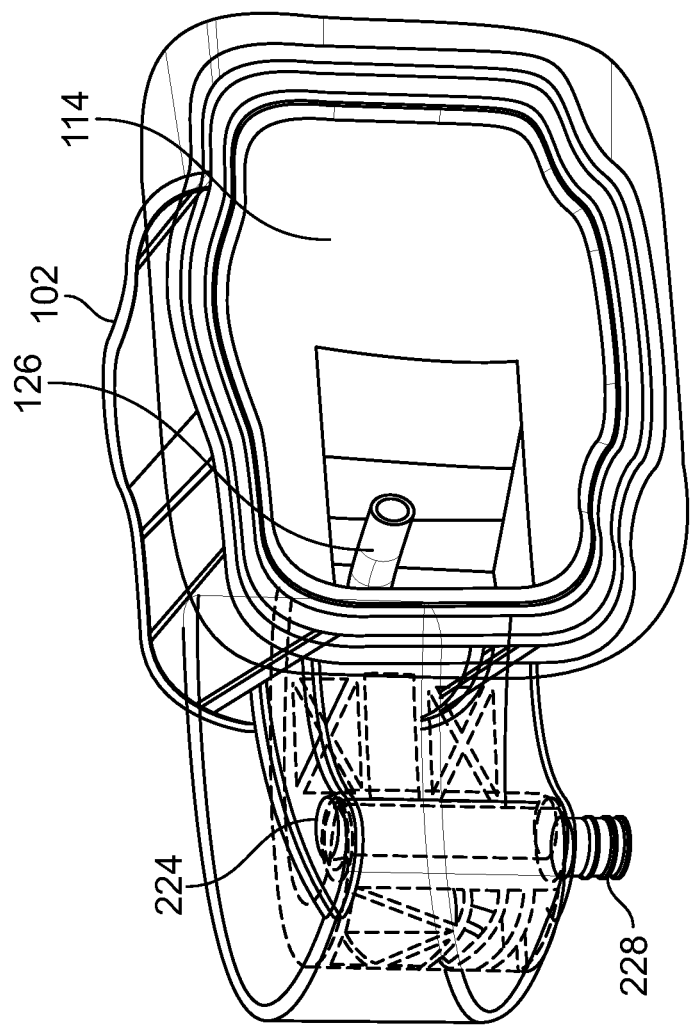
FIG. 20 illustrates a perspective front view of a nozzle-receiving assembly, according to an embodiment of the present disclosure.

FIG. 19 illustrates a perspective front exploded view of the nozzle-receiving assembly 100, according to an embodiment of the present disclosure. FIG. 20 illustrates a perspective front view of the nozzle-receiving assembly 100. Referring to FIGS. 19 and 20, a distal end 220 of the hinge arm 128 may include a pivot tube 222 that pivotally couples (such as is retained or retains) a reciprocal pivot tube 224 of the housing 102. An additive fill port 228 extends downwardly from housing 102 below the pivotal coupling of the pivot tube 222 and the pivot tube 224. A valve insert 230 may be retained within the additive fill port 228.

Figure 21:
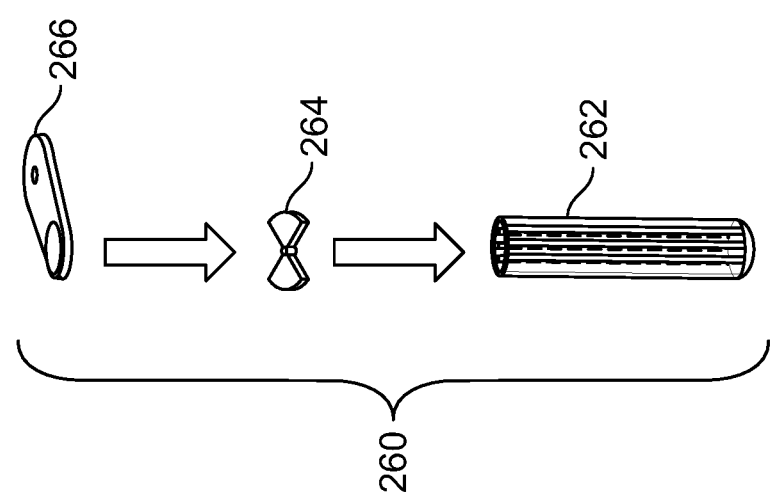
FIG. 21 illustrates a perspective front exploded view of a securing pin member, according to an embodiment of the present disclosure.

FIG. 21 illustrates a perspective front exploded view of a securing pin member 260, according to an embodiment of the present disclosure. The securing pin member 260 includes an axle tube 262, a rotatable half valve 264, and a cap 266. In at least one embodiment, referring to FIGS. 19-21, the valve 264 is secured into a hollow keyed portion of the axle tube 262. The cap 266 is then secured over the axle tube 262, which is sealingly secured within a central passage of the pivot tube 222 and/or the pivot tube 224. The valve 264 rotates in response to the pivotal motion of the hinge arm 128. When the door 114 is in the closed position, the valve 264 closes a fluid passage. When the door 114 is in the open position, the valve 264 provides an opening through the fluid passage.

Figure 22:
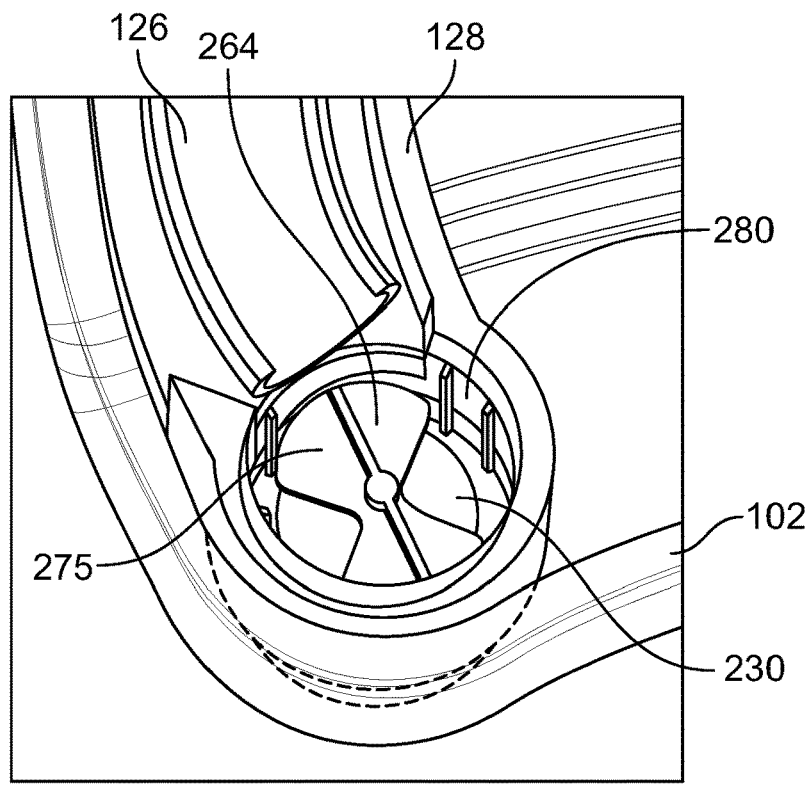
FIG. 22 illustrates a top view of a valve member in a closed position, according to an embodiment of the present disclosure.
Figure 23:
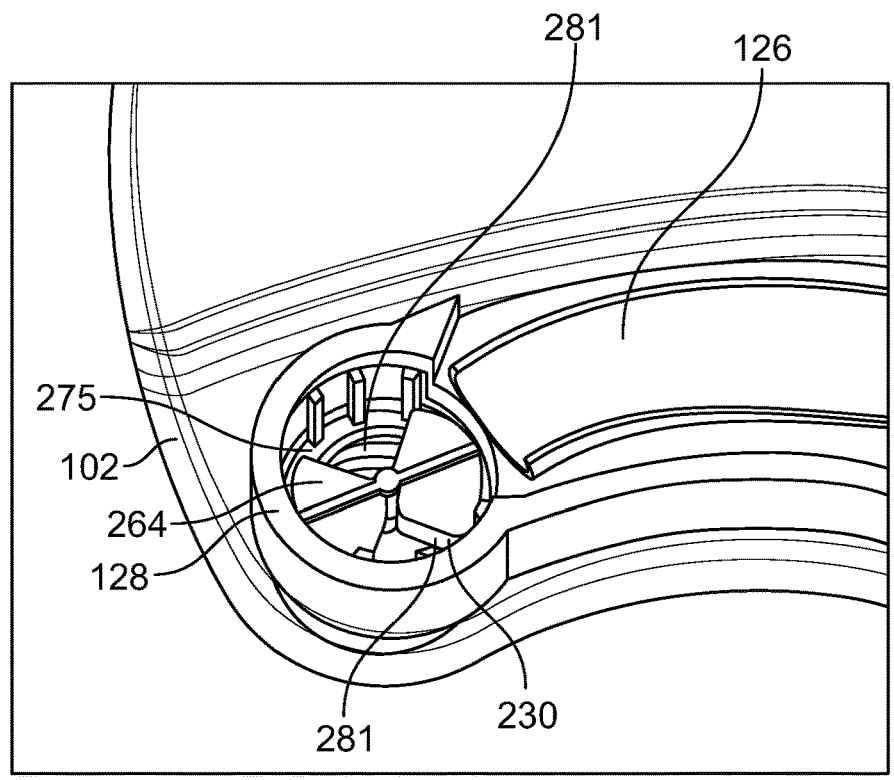
FIG. 23 illustrates a top view of a valve member in an open position, according to an embodiment of the present disclosure.

FIG. 22 illustrates a top view of a valve member 275 in a closed position, according to an embodiment of the present disclosure. FIG. 23 illustrates a top view of the valve member 275 in an open position. The valve member 275 includes the valve insert 230 and the valve 264. The valve insert 230 is fixed in position within the fluid passage 280, which extends through the pivot axle of the hinge arm 128 and the housing 102. The valve 264 rotates within the fluid passage 280 as the hinge arm 128 rotates relative to the housing 102. Referring to FIGS. 19-23, when the door 114 is closed, the valve 264 and the valve insert 230 cooperate to close the outlet of the fluid passage 280, as shown in FIG. 22. When the door 114 is opened, the valve 264 and the valve insert 230 cooperate to open the outlet of the fluid passage 280 to form fluid outlets 281, which allow additive to flow therethrough, as shown in FIG. 23. As such, the valve member 275, which may include the valve insert 230 and the valve 264, operates to selectively close and open the outlet of the fluid passage. The closed position of the valve member 275 (as shown in FIG. 22) is associated with the closed position of the door 114. The open position of the valve member 275 is associated with the open position of the door 114.

The valve member 275 is disposed within the fluid passage 280, such as a portion of the additive fill port. The valve member closes 275 the fluid passage 280 when the door 114 is in the closed position. The valve member 275 provides at least one outlet 281 in the fluid passage 280 when the door 114 is in the open position.

Various other valve members may be used other than shown. For example, a valve may include a flap or other such structure within the fill passage 280 that moves between open and closed positions based on the position of the door 114. Optionally, the nozzle-receiving assembly 100 may not include a valve member.

Embodiments of the present disclosure may be used with capped or capless inlets. Dust flaps may be used with various embodiments.

As described herein, certain embodiments of the present disclosure provide nozzle-receiving assemblies that are configured to receive a fuel-dispensing nozzle (such as a diesel fuel-dispensing nozzle) and a DEF-dispensing nozzle. The nozzle-receiving assemblies include a main housing and a door moveably secured to the main housing. A fuel inlet is disposed within the main housing. A DEF inlet is secured to an interior surface of the door. When the door is opened, the DEF inlet is distally located from the fuel inlet, thereby reducing a potential of DEF mixing with fuel.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A nozzle-receiving assembly comprising:
   a housing including a fuel inlet that is configured to receive a first nozzle of a fuel dispenser in order to dispense fuel into a fuel fill pipe coupled to the fuel inlet;
   a door moveably secured to the housing, wherein the door is configured to be moved between an open position and a closed position with respect to the housing; and
   an additive inlet extending from the door, wherein the additive inlet is configured to receive a second nozzle of an additive dispenser to dispense additive into an additive conduit coupled to the additive inlet,
   wherein when the door is in the open position, a first distance between the additive inlet and a distal end of the door is less than a second distance between the additive inlet and the fuel inlet.

2. The nozzle-receiving assembly of claim 1, wherein the fuel is diesel fuel and the additive is diesel emission fluid (DEF).

3. The nozzle-receiving assembly of claim 1, further comprising a hinge arm that moveably couples the door to the housing, wherein at least a portion of the additive conduit is secured to the hinge arm.

4. The nozzle-receiving assembly of claim 3, wherein the additive conduit comprises at least one curved segment secured to the hinge arm.

5. The nozzle-receiving assembly of claim 1, wherein the additive inlet extends from an interior surface of the door.

6. The nozzle-receiving assembly of claim 1, wherein the fuel inlet and the additive inlet are covered by the door in the closed position, and wherein the fuel inlet and the additive inlet are exposed when the door is in the open position.

7. The nozzle-receiving assembly of claim 1, wherein the fuel inlet is spaced apart from the additive inlet a first distance when the door is in the closed position, wherein the fuel inlet is spaced apart from the additive inlet a second distance when the door is in the open position, and wherein the second distance exceeds the first distance.

8. The nozzle-receiving assembly of claim 1, further comprising a trough extending from the door, wherein the trough defines a fluid retention chamber that connects to the additive inlet.

9. The nozzle-receiving assembly of claim 1, wherein the additive inlet comprises a moveable flap that is configured to open and close to selectively open and close the additive inlet.

10. The nozzle-receiving assembly of claim 1, wherein the additive inlet is outwardly disposed and spaced apart from the fuel inlet when the door is in the closed position.

11. The nozzle-receiving assembly of claim 1, further comprising a magnetic interlock ring connected to one or both of the additive inlet or the additive conduit.

12. The nozzle-receiving assembly of claim 1, further comprising a flexible tube that extends through a portion of the housing, wherein the flexible tube connects to the additive conduit.

13. The nozzle receiving assembly of claim 1, wherein the additive conduit connects to an additive fill line when the door is in the open position, and wherein the additive conduit is disconnected from the additive fill line when the door is in the closed position.

14. The nozzle-receiving assembly of claim 1, wherein the door moveably connects to the housing through a pivot axle, wherein at least a portion of an additive fill port extends through the pivot axle, and wherein the additive conduit connects to the at least a portion of the additive fill port.

15. The nozzle-receiving assembly of claim 14, wherein a valve member is disposed within the additive fill port, wherein the valve member closes the additive fill port when the door is in the closed position, and wherein the valve member provides at least one outlet in the additive fill port when the door is in the open position.

16. A nozzle-receiving assembly comprising:
a housing including a fuel inlet that is configured to receive a first nozzle of a diesel fuel dispenser in order to dispense diesel fuel into a fuel fill pipe coupled to the fuel inlet;
a door moveably secured to the housing, wherein the door is configured to be moved between an open position and a closed position;
a hinge arm that moveably couples the door to the housing; and
an additive inlet extending from an interior surface of the door, wherein the additive inlet is configured to receive a second nozzle of a diesel emission fluid (DEF) dispenser to dispense DEF into an additive conduit coupled to the additive inlet, wherein at least a portion of the additive conduit is secured to the hinge arm,
wherein the fuel inlet and the additive inlet are covered by the door in the closed position, and wherein the fuel inlet and the additive inlet are exposed when the door is in the open position,
wherein the fuel inlet is spaced apart from the additive inlet a first distance when the door is in the closed position, wherein the fuel inlet is spaced apart from the additive inlet a second distance when the door is in the open position, and wherein the second distance exceeds the first distance,
wherein the additive inlet is outwardly disposed and spaced apart from the fuel inlet when the door is in the closed position.

17. The nozzle-receiving assembly of claim 16, wherein the additive conduit comprises at least one curved segment secured to the hinge arm.

18. The nozzle-receiving assembly of claim 16, further comprising a trough extending from the door, wherein the trough defines a fluid retention chamber that connects to the additive inlet.

19. The nozzle-receiving assembly of claim 16, wherein the additive inlet comprises a moveable flap that is configured to open and close to selectively open and close the additive inlet.

20. The nozzle-receiving assembly of claim 16, wherein the door moveably connects to the housing through a pivot axle, wherein at least a portion of an additive fill port extends through the pivot axle, wherein the additive conduit connects to the at least a portion of the additive fill port, wherein a valve member is disposed within the additive fill port, wherein the valve member closes the additive fill port when the door is in the closed position, and wherein the valve member provides at least one outlet in the additive fill port when the door is in the open position.

* * * * *